Patented July 12, 1949

UNITED STATES PATENT OFFICE 2,476,026

2-CYANO-2,3-DIACETOXY BUTANES

Albert M. Clifford and John R. Long, Stow, Ohio, assignors to Wingfoot Corporation, Akron, Ohio, a corporation of Delaware No Drawing. Original application January 18, 1940, Serial No. 314,462. Divided and this application March 19, 1943, Serial No. 479,764

5 Claims. (Cl. 260—465.4)

This invention relates to new compounds containing a nitrile radical and to methods of preparing the same. More particularly, it relates to intermediates which may be used in the preparation of compounds of unsaturated nature intended for use in the preparation of polymerized compositions.

In the preparation of polymerized compositions various unsaturated substances have been polymerized, either alone or in admixture with other unsaturated compounds. To the available monomers have recently been added the 2-cyano 1,3-butadienes, which may be prepared from 2-cyano diacetoxy butanes.

It is, accordingly, an object of this invention to make available the 2-cyano diacetoxy butanes. Other objects are also attained in the practice of the invention, as will appear hereinafter.

The method of preparation of the 2-cyano diacetoxy butanes, in general, consists in treating an acetoxy butanone or a hydroxy butanone with hydrogen cyanide to convert the ketone to a cyanhydrin. Thereafter, this cyanhydrin is reacted with acetic anhydride which effects the introduction of one or two acetoxy groups, the product being, in either case, a 2-cyano diacetoxy butane.

To illustrate the process, the following examples are given, but will be understood that the same are merely by way of illustration, and that the invention is not limited thereto.

Example 1

Into 246 grams of 3-acetoxy-2-butanone there was passed 51.5 grams of hydrogen cyanide, the temperature being maintained between 40 and 50° C. during the operation. The mixture, containing a nitrile compound, was then acetylated with 212 grams of acetic anhydride containing 5 grams of sulphuric acid. The reaction mixture was fractionated under reduced pressure to give 2-cyano 2,3-diacetoxy butane having a boiling point of 124–138° C./8 mm. The density was $d_{30}=1.0905$, and the index of refraction was $n_D{}^{26}=1.4282$. The compound has not previously been described.

The reactions involved in the foregoing example may be represented by the following equations:

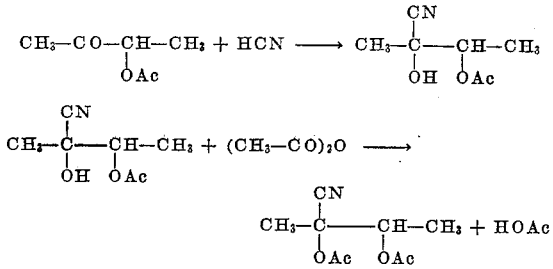

Example 2

In another preparation, 408 grams of 1-hydroxy 2-methyl-3-butanone was treated with 108 grams of hydrogen cyanide and then with 897 grams of acetic anhydride in the manner described above, to yield 2-methyl 3-cyano 1,3-diacetoxy butane. This intermediate compound, which is believed to be new, had a boiling point of 148–158° C./11 mm. The density was $d_{30}=1.0865$, and the index of refraction was $n_D{}^{25}=1.4402$.

The conditions given in the foregoing examples can be varied, of course, the temperature at which the hydrogen cyanide gas is passed in being preferably in the neighborhood of 40–60° C. and that of acetylation somewhat higher, from 100 to 120° C. Distillation of the 2-cyano diacetoxy butane should be carried out under reduced pressure, a pressure corresponding to 10 to 60 mm. of mercury being found satisfactory.

From the foregoing, it will be apparent that the present invention embraces within its scope a class of new compounds, namely, the 2-cyano diacetoxy butanes, which includes, among others, 2-cyano 2,3-diacetoxy butane; 2-methyl 3-cyano 1,3-diacetoxy butane; 2-cyano 3-methyl 2,3-diacetoxy butane; 3-cyano 1,3-diacetoxy butane; 2-ethyl 3-cyano 1,3-diacetoxy butane; 2-phenyl 3-cyano 1,3-diacetoxy butane; and 4-phenyl 2-cyano 2,3-diacetoxy butane. The invention also includes methods of preparing the 2-cyano diacetoxy butanes.

This application is a division of our copending application, Serial No. 314,462, filed January 18, 1940, now matured into Patent No. 2,328,890.

While there have been described above certain preferred embodiments of the invention, the latter is not limited thereto, but only by the appended claims wherein it is intended to set forth all features of patentable novelty residing in the invention.

We claim:

1. The 2-cyano 2,3-diacetoxy butanes.
2. 2-cyano-2,3-diacetoxy butane.
3. A method of preparing cyano diacetoxy butanes which comprises treating one of the group consisting of hydroxy butanones and acetoxy butanones with hydrogen cyanide and then acetylating the nitrile so formed.
4. A method of preparing 2-cyano diacetoxy butanes which comprises treating one of the group consisting of hydroxy butanones and acetoxy butanones with hydrogen cyanide and then acetylating with acetic anhydride the nitrile so formed.
5. A method of preparing a diacetoxy-cyanobutane which comprises mixing a hydroxy-substituted butanone with gaseous hydrogen cyanide to form a dihydroxy-cyano-butane, mixing said product with acetic anhydride in the presence of sulfuric acid, and separating the resulting diacetoxy-cyano-butane.

ALBERT M. CLIFFORD.
JOHN R. LONG.

REFERENCES CITED

The following references are of record in the file of this patent:

UNITED STATES PATENTS

| Number | Name | Date |
|---|---|---|
| 2,208,328 | Lichty | July 16, 1940 |
| 2,265,814 | Ritchie | Dec. 9, 1941 |
| 2,301,131 | Lichty | Nov. 3, 1942 |

OTHER REFERENCES

Lichtenstern, Beilstein (4th ed.), vol. III, p. 403. (Copy in Scientific Library.)

Koch et al., Beilstein (4th ed.), Handbuch der Organischen Chemie (1921), vol. III, p. 401. (Copy in Div. 6.)